Patented Apr. 29, 1952

2,594,323

UNITED STATES PATENT OFFICE 2,594,323

24-SUBSTITUTED DELTA 5-CHOLENE-3,24-DIOLS

Robert H. Levin, A. Vern McIntosh, Jr., and George B. Spero, Kalamazoo, Mich., assignors to The Upjohn Company, Kalamazoo, Mich., a corporation of Michigan No Drawing. Application July 22, 1948,
Serial No. 40,166

7 Claims. (Cl. 260—397.5)

The present invention relates to certain 24-substituted 3,24-dihydroxy-delta 5-cholenes, their acyl esters, and to a method for their preparation.

The diols of this invention may be represented by the formula:

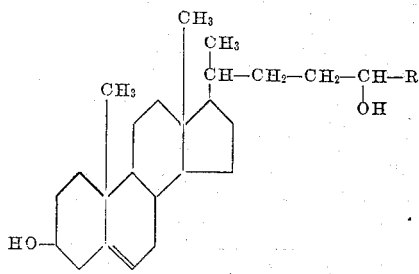

wherein R is an aryl or aralkyl group.

The products of the present invention are of value as intermediates in the synthesis of therapeutically-active steroid substances such as progesterone.

The diols of this invention may be obtained by the reaction of a 3-acyloxy-delta 5-cholene-24-al [J. Am. Chem. Soc. 70, 2956 (1948)] with an aryl or aralkyl magnesium halide (Grignard reagent). The aryl or aralkyl magnesium halides are prepared by the reaction of an aryl or aralkyl chloride, bromide, or iodide with magnesium in anhydrous ether according to procedure known in the art. The aryl and aralkyl ring may be unsubstituted or may contain substituents known not to interfere with the course of a Grignard reaction. Representative aryl and aralkyl groups are phenyl, benzyl, naphthyl, and alkoxy-, acyloxy-, and alkyl-substituted phenyl, benzyl and naphthyl radicals. The 3-acyloxy-delta 5-cholene-24-al, usually in a solvent such as benzene or ether, is added slowly to a warmed solution of the selected Grignard reagent to produce a Grignard addition complex. This complex is decomposed, as with ice or water and preferably in the presence of a substance such as a dilute mineral acid, ammonium chloride, or other similar reagent known in the art for preventing precipitation of magnesium hydroxide. Isomeric 24-substituted-delta 5-cholene-3,24-diols which result from decomposition of the Grignard complex are usually insoluble in organic solvents at reduced temperatures and may be isolated by filtration. When they are soluble, removal of the solvent is the most advantageous procedure. The pure isomers may be isolated from the mixture by crystallization.

Esters of the diols are obtained by reacting the selected diol with a suitable acid derivative such as the acid anhydride or acid chloride and isolating the ester thus obtained, the esterification and isolation being conducted in manner known in the art.

An alternative procedure for the preparation of the 3,24-diols is the reduction of a 3-acyloxy-24-aryl- or aralkyl-24-ketone using aluminum isopropoxide and isopropyl alcohol according to known procedure or with lithium aluminum hydride. The same isomers are obtained by this procedure as by the first method, and their separation by fractional crystallization may be accomplished in the same manner.

The fact that the fractional crystallization resulted in two stereoisomers of the diol and were not different compounds was shown by the oxidation of each isomer to the same 3,24-diketone in Example 9.

The following examples are illustrative of the present invention but are not to be construed as limiting:

*Example 1.—24-phenyl-delta 5-cholene-3,24-diols*

To a Grignard solution prepared from 0.6 gram of magnesium and 5.5 grams of bromobenzene in 250 milliliters of anhydrous ether, there was added over a period of one hour 2.0 grams of 3-(β)-acetoxy-delta 5-cholene-24-al [J. Am. Chem. Soc. 70, 2956 (1948)] dissolved in 75 milliliters of benzene. The reaction mixture was heated under reflux during the mixing of the reagents and for one hour thereafter. The mixture was then cooled and 3 N hydrochloric acid added to decompose the Grignard complex formed. An insoluble precipitate of the stereoisomeric 24-phenyl-delta 5-cholene-3 (β),24 diols was obtained. This precipitate, upon crystallization from benzene, gave an isomer (A) melting at 214–217 degrees centigrade; $[\alpha]_D^{25}$ —7.0 degrees.

The ether-benzene phase mother liquors from the above were separated and steam-distilled. The resulting water-insoluble, non-volatile residue which melted at 186–190 degrees centigrade, upon crystallization from benzene gave an isomer (B) melting at 184–186 degrees centigrade; $[\alpha]_D^{25}$ —38.2 degrees.

*Example 2.—24-phenyl-delta 5-cholene-3,24-diacetate (A)*

One-half gram of isomer (A) from Example 1 was acetylated by heating under reflux for 4.5 hours with five milliliters of acetic anhydride and 15 milliliters of pyridine. The acetate was isolated by pouring the reaction mixture into water, filtering, and crystallizing the solids thus obtained from alcohol. The diacetate of isomer (A) thus obtained melted at 93–94 degrees centigrade; $[\alpha]_D^{25}$ —22.3 degrees.

*Example 3.—24-phenyl-delta 5-cholene-3,24-diacetate (B)*

In a manner similar to that of Example 2, the diacetate of isomer (B) from Example 1, melting at 164–165 degrees centigrade and having an $[\alpha]_D^{25}$ of —60.4 degrees, was obtained.

*Example 4.—24-phenyl-delta 5-cholene-3,24-dibenzoate (A)*

One gram of isomer (A) from Example 1 was mixed with 1.5 milliliters of benzoyl chloride and 4.0 milliliters of pyridine and allowed to stand at room temperature for sixteen hours. The reaction product was poured into water, the water solution extracted with ether, the ether solution washed with dilute alkali and water, the ether removed, and the residue then crystallized from benzene and hexane. There was thus obtained a 24-phenyl-delta 5-cholene-3 ($\beta$),24-dibenzoate, melting at 160–161 degrees centigrade;

$[\alpha]_D^{25}$ —27.2 degrees

*Example 5.—24-phenyl-delta 5-cholene 3,24-dibenzoate (B)*

In a manner identical with that of Example 4, there was obtained from isomer (B) of Example 1 a 24-phenyl-delta 5-cholene-3 ($\beta$),24-dibenzoate, melting at 175–177 degrees centigrade; $[\alpha]_D^{25}$ —10.1 degrees.

*Example 6.—3-hydroxy-24-keto-24-p-anisyl-delta 5-cholene*

To a Grignard solution prepared from 2.4 grams of magnesium, 13 milliliters of p-bromoanisole, and 50 milliliters of anhydrous ether, cooled in an ice bath, there was added 9.17 grams of anhydrous cadmium chloride. The mixture was heated under reflux for one hour and then cooled to zero degrees centigrade. A solution of 8.0 grams of 3-($\beta$)-formyloxy-delta 5-cholenic acid chloride [J. Am. Chem. Soc. 67, 740 (1945)] in 50 milliliters of benzene was added over a period of 20 minutes. The reaction mixture was heated under reflux for one hour, cooled, and poured into a mixture of ice and hydrochloric acid. The ether-benzene layer was separated, washed with dilute sodium hydroxide solution, water, dried, and evaporated to dryness. The resulting residue was saponified by refluxing for one hour with 100 milliliters of five percent methanolic potassium hydroxide solution. After reflux, the solution was diluted with water and extracted with ether. The ether was washed, dried, and evaporated to dryness. The resulting residue, 3($\beta$)-hydroxy-24-keto-24-p-anisyl-delta 5-cholene, was crystallized from acetone; M. P. 154–157 degrees centigrade; oxime, M. P. 177–179 degrees centigrade.

*Example 7.—24-p-anisyl-delta 5-cholene-3,24-diols*

To a solution of 2.45 grams of lithium aluminum hydride in 200 milliliters of anhydrous ether, a solution of 4.35 grams of 3 ($\beta$)-hydroxy-24-keto-24-anisyl-delta 5-cholene in 1300 milliliters of anhydrous ether was added over a period of twenty minutes. The reaction mixture was agitated during the addition, whereafter the mixture was allowed to stand at room temperature for 40 minutes. The above steps were carried out in an atmosphere of nitrogen. Excess lithium aluminum hydride was slowly decomposed by addition of water and 200 milliliters of iced five percent hydrochloric acid added. Some of the product precipitated at this point and was filtered from solution. The aqueous phase was then extracted with chloroform, ether and chloroform fractions washed with water, combined, dried and concentrated. On cooling, a mixture of isomers of 24-p-anisyl-delta 5-cholene-3($\beta$),24 diols crystallized. The yield was 3.1 grams; M. P. 160–185 degrees centigrade.

*Example 8.—24-benzyl-delta 5-cholene-3,24-diols*

A solution of benzyl magnesium chloride in 100 milliliters of ether was prepared from 3.3 milliliters of benzyl chloride and 0.6 gram of magnesium turnings. A second solution of 2.0 grams (0.005 mole) of 3 ($\beta$)-acetoxy-delta 5-cholene-24-al, M. P. 147–149 degrees centigrade, in 100 milliliters of dry benzene was added thereto over a period of thirty minutes, whereupon a precipitate formed. The mixture was heated under reflux for thirty minutes, decomposed with ice and hydrochloric acid, and the resulting benzene-ether solution concentrated and steam-distilled to leave a semisolid residue. This residue was dissolved in ether, washed with dilute sodium hydroxide solution, and with water. After drying the ether solution was concentrated, dissolved in benzene, and chromatographed over alumina. The main fraction was eluted with benzene and two percent methanol to give 1.9 grams of a material melting at 60–70 degrees centigrade. Recrystallization from methanol-water gave 24-benzyl-delta 5-cholene-3,24-diol melting at 67–69 degrees centigrade.

*Example 9.—3,24-diketo-24-phenyl-delta 4-cholene from 1(A)*

As proof of structure, one-half gram of 24-phenyl-delta 5-cholene-3 ($\beta$),24-diol, melting at 214–217 degrees centrigrade (isomer 1A), was dissolved in 15 milliliters of toluene and five milliliters of cyclohexanone. One-half gram of aluminum isopropoxide was added thereto and the solution heated under reflux for four hours. The reaction product was cooled, poured into 50 milliliters of five percent hydrochloric acid, and extracted with ether. The ether solution was washed with water, dried, and evaporated to give crude 3,24-diketo-24-phenyl-delta 4-cholene, which, after crystallization from acetone, melted at 169–171 degrees centigrade.

*Example 10.—3,24-diketo-24-phenyl-delta 4-cholene from 1(B)*

As further proof of structure, one-half gram of 24-phenyl-delta 5-cholene-3 ($\beta$),24-diol, melting at 184–186 degrees centigrade (isomer 1B), was oxidized as in Example 9. After crystallization from acetone, 3,24-diketo-24-phenyl-delta 4-cholene, melting at 171–173 degrees centigrade, was obtained; $[\alpha]_D^{25}$+78.1 degrees. When mixed with the product obtained in Example 9, there was no depression of melting point.

It is to be understood that the invention is not limited to the exact details or compounds shown and described, as obvious modifications and substitution of equivalents may be made in the present invention without departing from the spirit or scope thereof which will be apparent to one skilled in the art and we therefore limit ourselves only as defined in the appended claims.

We claim:
1. A compound selected from the group consisting of 24-mono-phenyl, 24-mono-anisyl-, and 24-mono-benzyl-delta 5-cholene-3,24-diols and acyl diesters thereof, wherein the acyl group is of the formula AcO, Ac being the residue of an unsubstituted organic monocarboxylic acid containing from 2 to 7 carbon atoms, inclusive.
2. 24-mono-phenyl-delta 5-cholene-3,24-diol.
3. 24-mono-p-anisyl-delta 5-cholene-3,24-diol.
4. 24-mono-benzyl-delta 5-cholene-3,24-diol.
5. In a process for the preparation of a 24-substituted delta 5-cholene-3,24-diol, the steps which include: mixing a 3-acyloxy-delta 5-cholene-24-al with a substantially anhydrous ether solution of an R—MgX compound, wherein R is a radical selected from the group consisting of aryl, aralkyl, and alkoxy-, acyl-, and alkyl-substituted aryl and aralkyl radicals and X is a halogen selected from the group consisting of chlorine, bromine, and iodine; heating the mixture under reflux; decomposing the Grignard complex; and, isolating a 24-substituted delta 5-cholene-3,24-diol, wherein the substituting radical in the 24 position corresponds to the R group in the Grignard reagent employed.
6. 24-mono-phenyl-delta 5-cholene-3,24-diacetate.
7. 24-mono-phenyl-delta 5-cholene-3,24-dibenzoate.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,259,698 | Johannessohn | Oct. 21, 1941 |
| 2,304,100 | Julian | Dec. 8, 1942 |

FOREIGN PATENTS

| Number | Country | Date |
|---|---|---|
| 59,201 | Denmark | Nov. 17, 1941 |